United States Patent [19]

Edmunds et al.

[11] Patent Number: 5,442,423
[45] Date of Patent: Aug. 15, 1995

[54] EXTERNAL DEVELOPMENT HOUSING BEARINGS

[75] Inventors: Cyril G. Edmunds; Steven C. Hart, both of Webster; Michael J. DeLuzio, Rochester, all of N.Y.

[73] Assignee: Xerox Corporation, Stamford, Conn.

[21] Appl. No.: 264,397

[22] Filed: Jun. 23, 1994

[51] Int. Cl.⁶ ............................................. G03G 21/00
[52] U.S. Cl. ................................... 355/215; 355/245
[58] Field of Search ..................... 355/215, 245, 260; 118/653

[56] References Cited

U.S. PATENT DOCUMENTS

| | | | |
|---|---|---|---|
| 3,788,275 | 1/1974 | Hanson | 118/637 |
| 4,040,386 | 8/1977 | Smith | 118/653 |
| 4,616,919 | 10/1986 | Adley et al. | 355/245 |
| 5,084,733 | 1/1992 | Katoh et al. | 355/251 |
| 5,166,731 | 11/1992 | Aimoto et al. | 355/215 |
| 5,187,326 | 2/1993 | Shirai | 355/251 |
| 5,202,729 | 4/1993 | Miyamoto et al. | 355/251 |
| 5,283,616 | 2/1994 | Numagami et al. | 355/245 |
| 5,287,148 | 2/1994 | Sakemi et al. | 355/245 |

*Primary Examiner*—William J. Royer
*Attorney, Agent, or Firm*—John S. Wagley

[57] ABSTRACT

A developer unit includes a housing defining a chamber for storing a supply of toner therein. The developer unit also includes a member for moving the toner in the chamber of the housing and a support structure, projecting from the housing, for supporting the member. The developer unit further includes a bearing located in the support structure. The bearing is spaced from the housing and rotatably supports the member.

23 Claims, 6 Drawing Sheets

EXTERNAL DEVELOPMENT HOUSING BEARINGS

The present invention relates to a developer apparatus for electrophotographic printing. More specifically, the invention relates to bearings for supporting shafts within the developer apparatus.

Cross reference is made to the following application filed concurrently herewith: United States Application No. 081264,821, entitled "Multi-Pole Magnetic Seals", by S. C. Hart et al.

In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as "toner." Toner is held on the image areas by the electrostatic charge on the photoreceptor surface. Thus, a toner image is produced in conformity with a light image of the original being reproduced. The toner image may then be transferred to a substrate or support member (e.g., paper), and the image affixed thereto to form a permanent record of the image to be reproduced. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

In the process of electrophotographic printing, the step of conveying toner to the latent image on the photoreceptor is known as "development." The object of effective development of a latent image on the photoreceptor is to convey toner to the latent image at a controlled rate so that the toner effectively adheres electrostatically to the charged areas on the latent image. At a development station, a development system or developer unit develops the latent image recorded on the photoconductive surface. A chamber in a developer housing stores a supply of developer material. To convey the developer material in the chamber to the latent image and to mix and triboelectrically charge the developer, a series of augers and magnetic rollers are strategically placed in the chamber and supported by the developer housing. Since these augers and rollers rotate, bearings are used to support the rollers at the housing.

A typical prior art developer bearing arrangement 10 is shown in FIG. 4. A bearing 12 usually in the form of a sealed bearing having lip seals 14 on both faces of bearing 12 is housed in the developer housing 15. Journals 16 extend from auger 17 and protrude through bore 18 of the bearing 12.

As the auger rotates, the displacement of the grease within the bearing and the rubbing of the lip seal against the bearing races generate heat. The heat causes the developer material located in the chamber adjacent to the bearings, seals, and auger to become hot. Further heat is generated by the work performed on the developer material by the augers and magnetic brush rollers. Also, eddy current losses in the magnetic brush roller generate heat which is dissipated into the developer material. The heat from these sources can cause either the toner alone or the toner and carrier to fuse together and form agglomerates or lumps of material in the developer material adjacent the hot bearings, seals, augers and rollers. These agglomerates or lumps progress throughout the developer chamber. When the agglomerates or lumps reach the latent image to form the developed image they cause streaking and other quality problems. In some cases the heat is so extreme that the toner becomes liquefied, migrates through the lip seals of bearings and causes bearing failures and/or seal failures.

Now referring to FIG. 2, in an attempt to reduce the harmful effects of heat originating from the bearings, another prior art developer bearing arrangement 20 has been devised in which a seal 22 is spaced from a bearing 24.

Auger 26 is located in a first chamber 28 formed by developer housing 30. The first chamber 28 contains developer material which is transported, agitated, and triboelectrically charged by auger 26 and elsewhere in the housing 30. An auger journal 32 extends from auger 26 through an opening in the developer housing 30. The seal 22 is located in the opening adjacent the chamber 28. The bearing 24 is located adjacent an outer face 34 of the developer housing 30. The bearing 24 is parallel to and spaced from the seal 22. A second chamber 36 is thus formed between the bearing 24 and the seal 22.

As more compact copiers and printers are produced, the developer housings become smaller and the augers and rollers rotate more swiftly aggravating the aforementioned heating problem. Temperature rise within development bearings generally rises linearly with the speed of the shaft. Color printers and copiers which usually require a plurality of developer housings, particularly, use small developer housings and small swiftly rotating rollers and augers. To further complicate the problems with heating in color printers and copiers, the lower melting temperature toners used in color copiers are more susceptible to agglomerates and streaking.

The heat from development bearings in development systems utilizing hybrid scavengeless development is particularly a concern. The purpose and function of scavengeless development are described more fully in, for example, U.S. Pat. No. 4,868,600 to Hays et al., U.S. Pat. No. 4,984,019 to Folkins, U.S. Pat. No. 5,010,367 to Hays, or U.S. Pat. No. 5,063,875 to Folkins et al. U.S. Pat. No. 4,868,600 is incorporated herein by reference. In a scavengeless development system, toner is detached from the donor roller by applying AC electric field to self-spaced electrode structures, commonly in the form of wires positioned in the nip between a donor roller and photoreceptor. This forms a toner powder cloud in the nip and the latent image attracts toner from the powder cloud thereto. Because there is no physical contact between the development apparatus and the photoreceptor, scavengeless development is useful for devices in which different types of toner are supplied onto the same photoreceptor such as in "tri-level"; "recharge, expose and develop"; "highlight"; or "image on image" color xerography. The lower melting point of color toners and the greater sensitivity of colors to streaking in the color application of HSD make the generation of heat from the development bearings particularly harmful. Furthermore, heated and or liquefied agglomerates can form toner fibers in HSD and collect on the electrode wires utilized to form the toner powder cloud. These toner fibers formed by heating the developer cause streaking to occur on the document and may damage the electrode wires. Also, the magnetic roller in HSD runs at much greater rotational speed than the magnetic rollers in conventional magnetic brush development, the higher speed magnetic roller being a source of heat.

The following disclosures may be relevant to various aspects of the present invention:

U.S. Pat. No. 5,202,729 Patentee: Miyamoto et al. Issue Date: Apr. 13, 1993

U.S. Pat. No. 5,187,326 Patentee: Shirai Issue Date: Feb. 16, 1993

U.S. Pat. No. 5,084,733 Patentee: Katoh et al. Issue Date: Jan. 28, 1992

U.S. Pat. No. 4,616,919 Patentee: Adley et al. Issue Date: Oct. 14, 1986

U.S. Pat. No. 4,040,386 Patentee: Smith Issue Date: Aug. 9, 1977

U.S. Pat. No. 3,788,275 Patentee: Hanson Issue Date: Jan. 29, 1974

The relevant portions of the foregoing disclosures may be briefly summarized as follows:

U.S. Pat. No. 5,202,729 discloses a developing apparatus having a container for containing a one component developer, and a rotatable developing roller disposed facing an image bearing member to carry developer from the container to a development zone where it is supplied to an electrostatic latent image carried on an image bearing member. The developing roller includes a metal base member and a resin coating layer thereon in which fine conductive particles are dispersed. A sealing member is provided for preventing leakage of the developer from the container at the end of the developing roller, the sealing member being faced to the end region of the developing roller.

U.S. Pat. No. 5,187,326 discloses a developing apparatus including a container for containing a developer including magnetic particles. A rotatable developer carrying member is disposed in the container and faced to an image bearing member, for carrying the developer to a developing zone. A magnet is provided in the developer carrying member, and a magnetic sealing member is disposed adjacent to and in a rotational direction of the developer carrying member in a region inside of the container adjacent a longitudinal end of the developer carrying member, wherein the magnetic sealing member cooperates with the magnet to form a magnetic field effective to form a magnetic brush of the developer between the magnetic sealing member and the developer carrying member.

U.S. Pat. No. 5,084,733 discloses a developing apparatus including a developer carrying member for carrying a developer, a magnet disposed in the developer carrying member, and an elastic regulating member contacting the developer carrying member to regulate a thickness of a layer of the developer formed on the developer carrying member. The developer carrying member has a roughened surface over a width thereof larger than a width of the portion of the elastic regulating member contacting the developer carrying member while the magnet forms a magnetic field in a marginal region of the roughened surface of the developer carrying member not contacting the elastic regulating member to remove magnetic developer.

U.S. Pat. No. 4,616,919 discloses a sealing apparatus in a magnetic brush development device which is located in a non-contact fashion between the photoconductive drum and the magnetic brush roll. The seal has a plurality of ridges along the length of the seal that creates a differential air flow under the rotating photoconductive drum. This differential air flow prevents toner dust and bead carryout from axially migrating past the end of the photoconductive and magnetic roll.

U.S. Pat. No. 4,040,386 discloses an electrostatographic processor which has a development system which is equipped with a split housing and with retractable edge seals which may be moved toward and away from the imaging surface of the processor independently of the housing for the development system.

U.S. Pat. No. 3,788,275 discloses a device in which a magnetic flux field forms a shield of magnetic granules about a shaft member journaled for rotary movement. The shield is arranged to prevent contamination of the shaft member. Means for impelling the granules entrapped by the shield away from the bearing in the form of spiral grooves in a rotating member is also provided.

According to the present invention, there is provided a developer unit which comprises a housing defining a chamber for storing a supply of toner therein. The developer unit also comprises a member for moving the toner in the chamber of the housing and a support structure, projecting from the housing, for supporting the member. The developer unit further comprises a bearing located in the support structure. The bearing is spaced from the housing and rotatably supports the member.

According to the present invention, there is also provided an electrophotographic printing machine of the type having a developer unit adapted to develop with toner an electrostatic latent image recorded on a photoconductive member. The developer unit comprises a housing defining a chamber for storing a supply of toner therein. The developer unit also comprises a member for moving the toner in the chamber of the housing and a support structure, projecting from the housing, for supporting the member. The developer unit further comprises a bearing located in the support structure. The bearing is spaced from the housing and rotatably supports the member.

According to the present invention, there is further provided an apparatus for supporting with a bearing a shaft in the chamber of a housing storing a supply of toner. The apparatus comprises a plate defining an aperture adapted to have the bearing located therein and a spacer interposed between a portion of the plate and the housing to space the plate from the housing.

Figure 5:
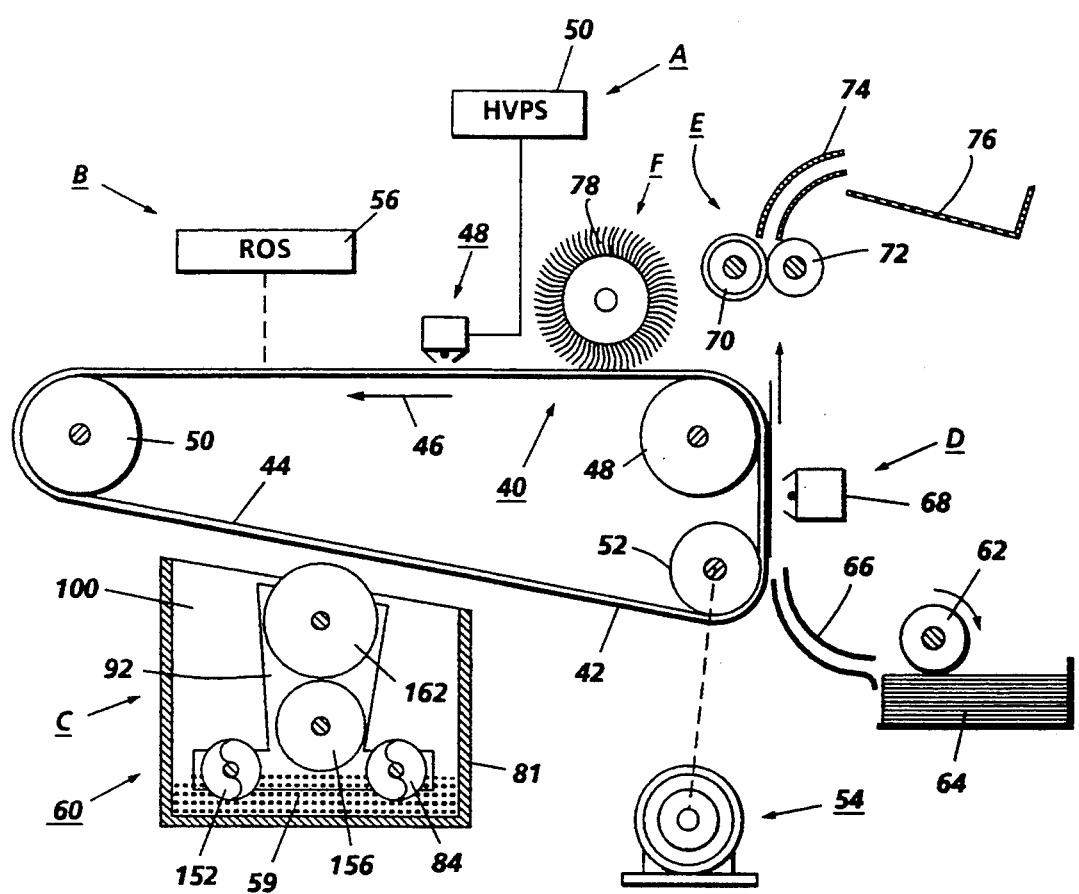
Figure 6:
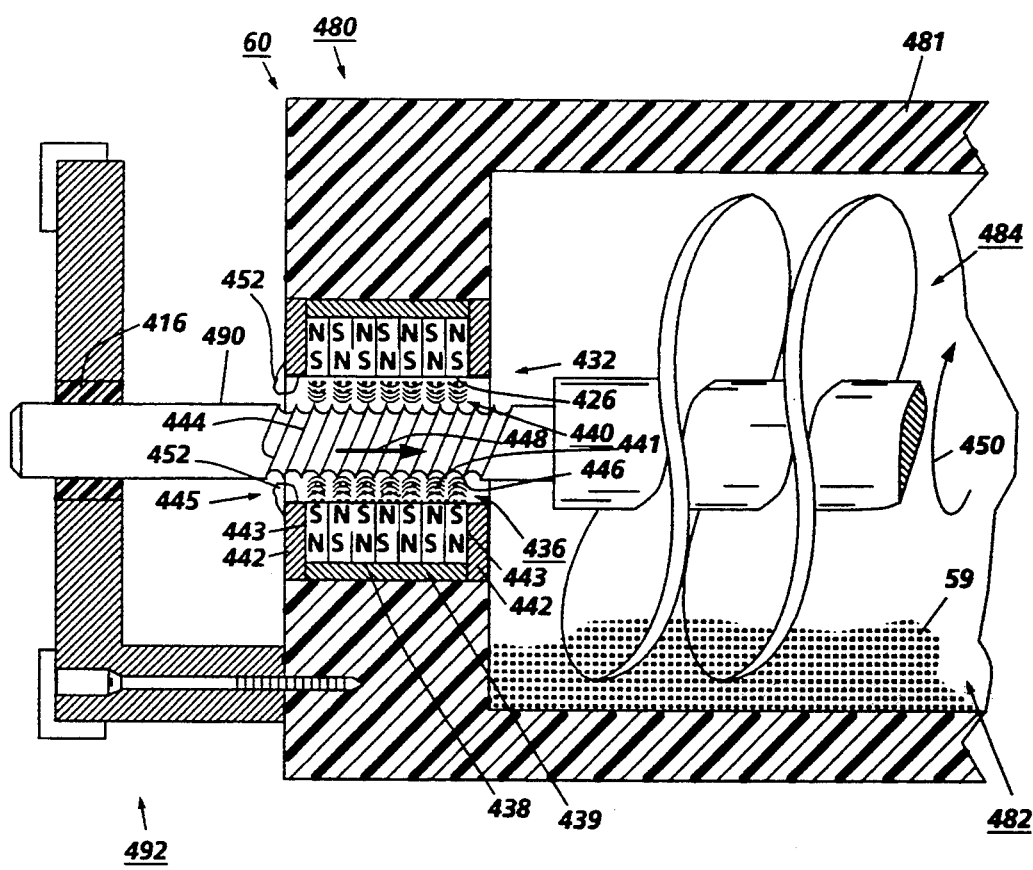

FIG. 5 is a schematic elevational view of an illustrative electrophotographic printing machine incorporating the external bearing configuration of the development apparatus of the present invention therein; and FIG. 6 is a partial sectional view of a multi-pole magnetic seal configuration utilizing a flexible multi-pole magnetic strip, an external bearing housing, and a spiral passageway for a development housing according to the present invention.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Inasmuch as the art of electrophotographic printing is well known, the various processing stations employed in the FIG. 5 printing machine will be shown hereinafter schematically and their operation described briefly with reference thereto.

Referring initially to FIG. 5, there is shown an illustrative electrophotographic printing machine incorporating the development apparatus of the present invention therein. The printing machine incorporates a photoreceptor 40 in the form of a belt having a photoconductive surface layer 42 on an electroconductive substrate 44. Preferably the surface 42 is made from an organic compound. The substrate 44 is preferably made from mylar film with an electrically conductive coating which is electrically grounded. The belt is driven by means of motor 54 along a path defined by rollers 48, 50 and 52, the direction of movement being counter-clockwise as viewed and as shown by arrow 46. Initially a portion of the belt 40 passes through a charge station A at which a corona generator 48 charges surface 42 to a relatively high, substantially uniform, potential. A high voltage power supply 50 is coupled to device 48.

Next, the charged portion of photoconductive surface 42 is advanced through exposure station B. At exposure station B, ROS 56 lays out the image in a series of horizontal scan lines with each line having a specified number of pixels per inch. The ROS includes a laser having a rotating polygon mirror block associated therewith. The ROS exposes the charged photoconductive surface of the printer.

After the electrostatic latent image has been recorded on photoconductive surface 42, belt 40 advances the latent image to development station C as shown in FIG. 5. At development station C, a development system or developer unit 60, develops the latent image recorded on the photoconductive surface. The chamber in developer housing 81 stores a supply of developer material 59. The developer material 59 may be a two component developer material of magnetic carrier granules having toner particles adhering triboelectrically thereto. It should be appreciated that the developer material may likewise comprise a one component developer material consisting primarily of toner particles.

Again referring to FIG. 5, after the electrostatic latent image has been developed, belt 40 advances the developed image to transfer station D, at which a copy sheet 64 is advanced by roller 62 and guides 66 into contact with the developed image on belt 40. A corona generator 68 is used to spray ions on to the back of the sheet so as to attract the toner image from belt 40 to the sheet. As the belt turns around roller 48, the sheet is stripped therefrom with the toner image thereon.

After transfer, the sheet is advanced by a conveyor (not shown) to fusing station E. Fusing station E includes a heated fuser roller 70 and a back-up roller 72. The sheet passes between fuser roller 70 and back-up roller 72 with the toner powder image contacting fuser roller 70. In this way, the toner powder image is permanently affixed to the sheet. After fusing, the sheet advances through chute 74 to catch tray 76 for subsequent removal from the printing machine by the operator.

After the sheet is separated from photoconductive surface 42 of belt 40, the residual developer material adhering to photoconductive surface 42 is removed therefrom at cleaning station F by a rotatably mounted fibrous brush 78 in contact with photoconductive surface 42. Subsequent to cleaning, a discharge lamp (not shown) floods photoconductive surface 42 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the development apparatus of the present invention therein.

Figure 1:
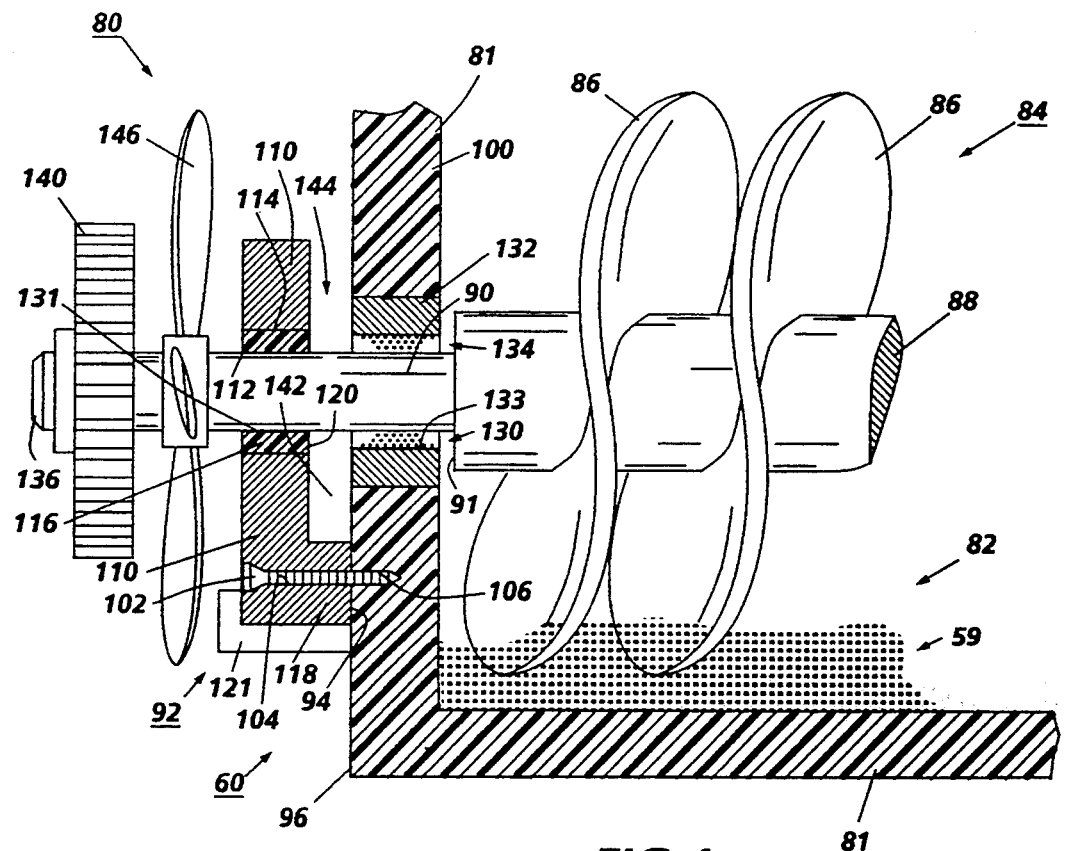
FIG. 1 is a partial sectional view of an external bearing configuration for an auger in a development housing according to the present invention.

According to the present invention, and referring to FIG. 1, a support system 80 is shown incorporated into the developer unit 60. Developer housing 81 forms chamber 82 in which developer material 59 is stored. Auger 84 is located within the chamber 82 to distribute, agitate, and triboelectrically charge the developer material 59. The auger 84 may have any suitable shape, but typically, includes paddles, vanes, or threads 86 which extend from a centrally located auger shaft 88. Auger journal 90 extend outwardly from end 91 of the auger shaft 88 and serve to support the auger 84.

The support system 80 serves to support the auger journal 90. The support system 80 includes a support structure or support member 92 which is preferably in the form of a bearing block. The bearing block 92 is interconnected to the developer housing 81 in any suitable manner. Preferably, however, the bearing block 92 has a first face 94 which mates with an outer face 96 of an end plate or housing wall 100 of the developer housing 81. The bearing block 92 is connected to the end plate 100 by any suitable method, such as by welding or fasteners. For example, threaded fasteners 102 may be slidably fit through openings 104 in the bearing block 92 and may be threadably attached to threaded holes 106 in the end plate 100. It should be appreciated that the bearing block 92 and the developer housing 81 may be either separate pieces with the block 92 attached to the developer housing or the block 92 may be made integral with the housing 81. If they are made integral, the block 92 may be made by such methods as molding or casting.

The bearing block 92 includes a plate portion or bearing wall 110 which is spaced from and generally parallel to the first face 94 of the bearing block 92. A bearing block bore 112 is formed in the bearing wall 110. Periphery 114 of bearing 116 is fitted into the bearing block bore 112. Inner face 120 of the bearing 116 is spaced from and generally parallel to the first face 94 of the bearing block 92 by a spacer portion 118 of block 92. It should be appreciated that the bearing 116 and the block 92 may be either separate pieces with the bearing 116 fitted into the block 92 or the bearing 116 may be made integral with the block 92. A lubricating material such as oil impregnated sintered bronze may be particularly well suited for the integral construction.

The developer housing 81 and the bearing block 92 can be made from any suitable durable material, such as a metal, durable plastic, or a composite material. For example, the developer housing 81 may be made of molded plastic and the bearing block 92 may be made of a thermally conductive material, aluminum being particularly well suited. Fins 121 may be cast, machined or attached to the bearing block 92 to assist in the dissipation of heat from the block 92. Heat generated in the developer housing 81 may be more readily dissipated if the housing 81 is made of a thermally conductive material such as a metal.

The bearing periphery 114 of the bearing 116 may either be slidably fitted within the bearing block bore 112 or be interference fitted thereto depending upon the loads generated from the auger 84. Bearing 116 may be any suitable durable bearing such as a rolling element bearing, a journal bearing, or a sleeve bearing. The bearing 116 may be a greased radial ball bearing with lip seals, but preferably, the bearing 116 is a shielded or low friction sealed bearing or an unsealed bearing. To minimize the cost of the bearing 116 and to provide a low friction bearing, the bearing 116 may be a sleeve bearing having a non-stick surface such as Teflon ®. The sleeve bearing may include an internal ridge (not shown) to seal closely against the journal 90. The bearing 116 includes a bearing bore 131 to which the auger journal 90 matingly fits.

Figure 1A:
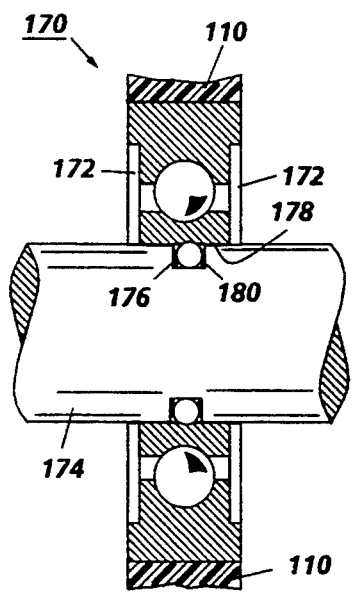
FIG. 1A is a partial sectional view of an alternate embodiment of external bearing configuration utilizing a ball bearing for an auger in a development housing according to the present invention.
Figure 2:
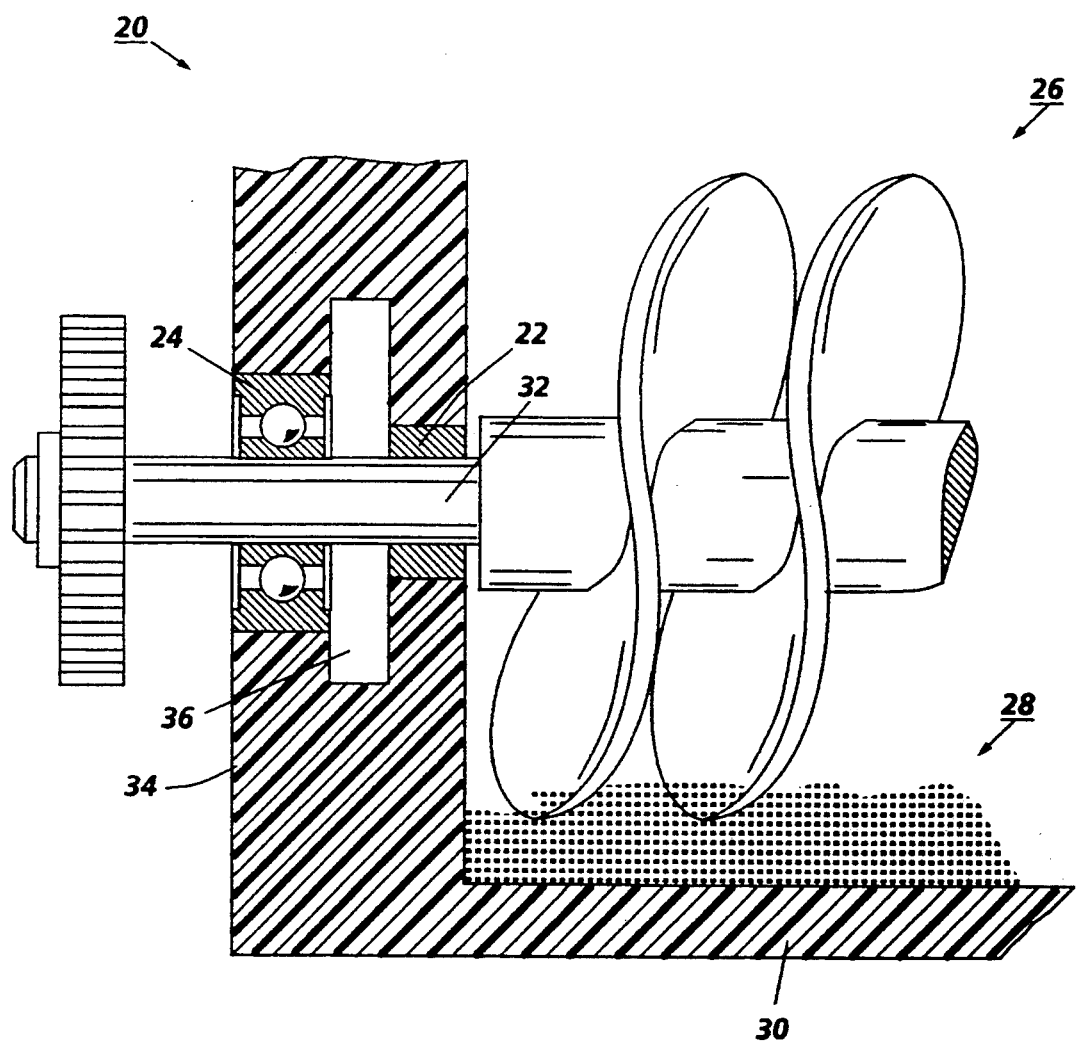
FIG. 2 is a partial sectional view of a prior art bearing configuration for an auger in a development housing.

Now referring to FIG. 1A an alternate bearing configuration of the present invention is shown as steel rolling element bearing 170. The bearing 170 is thermally conductive and may be a ball or roller bearing, but preferably is a radial ball bearing. The bearing may include lip seals 172 to contain grease for lubricating the bearing. Auger journal 174 is similar to journal 90 of FIG. 1, but preferably includes a circumferential groove 176 located in the journal 174 in such an axial position that it fits within bearing bore 178. A resilient compressible material, such as rubber or a synthetic rubber in the form of an O-ring 180 is located within the groove 176. When the auger journal 174 is installed in the bearing bore 178, the O-ring 180 is compressed and forms a thermal insulation layer between the journal 174 and the bearing 170. This thermal barrier inhibits the transfer of heat from the thermally conductive bearing 170 to the thermally conductive auger journal 174. The O-ring 180 being compressed between the journal 174 and the bearing 170, further serves to permit more relaxed tolerances for the bearing 170 and the auger journal 174. Since the bearing 116 of FIG. 1 is made from a thermally non-conductive material, the use of an O-ring and a journal groove with the configuration of FIG. 1 is generally unnecessary.

Referring again to FIG. 1, an opening 130 in the end plate 100 is generally concentric with bearing bore 131. The auger journal 90 fits through the opening 130 and extends into the bearing bore 131. A developer housing seal 132 is used to seal the developer material 59 within the chamber 82. The developer housing seal 132 seals the opening 130 in the developer housing 81. The seal 132 is secured to end plate 100. An inner periphery 133 of the seal 132 seals against the journal 90. The developer housing seal 132 may have any suitable configuration sufficient to retain the developer material 59 within the chamber 82. Lip seals, or other high friction seals may be utilized within the scope of the invention, but preferably, a low friction seal is used to minimize the heat generated by the seal on the auger journal 90. The low friction seals may include for example a fiber brush seal, a magnetic seal, a V-ring seal, and/or a felt seal. In those development systems where the developer material 59 includes a magnetizable component, the use of a magnetic seal is preferred. The developer seal 132 is preferably made from a permanently magnetic or magnetizable material and the journal 90 is spaced from the seal inner periphery 133 forming the opening 130. A magnetic field 134 formed in the opening 130 attracts a quantity of carrier granules thereto to form a curtain of carrier granules that inhibits the progression of the developer material 59 through the opening 130. The seal 132 may include shunts or shapers (not shown) in the form of steel washers on faces of the seal 132 to assist in directing the magnetic field.

The auger journal 90 may merely extend through the bearing 116 or, as shown in FIG. 1, may have an end 136 which extends considerably beyond the bearing 116. A drive member 140, such as a gear may be matingly fitted to the auger journal 90 in the area outboard of the bearing 116 located in the block 92 and near the end 136 of the journal 90. The gear 140 may be connected to a drive means (not shown) used to transmit torque to the auger 84.

An air space or block chamber 142 is formed between the bearing wall 110 of the bearing block 92 and the end plate 100 of the developer housing 81. This block chamber 142 serves as a collection point for any developer material 59 which may pass through developer housing seal 132 at the opening 130. Because the developer material 59 is thereby contained within the bearing block 92, the developer housing seal 132 may be slightly less efficient at containing developer than a high friction lip seal and yet prove to be acceptable. Whereas, as with prior art developer housings, if the developer material 59 which were to pass through the seal and exit the developer unit 60, the use of such less effective low friction seals would be unacceptable. Preferably the bearing block 92 includes cooling openings 144 which assist in the free and forced convection cooling of the bearing block 92. Fan 146 may be secured to the auger journal 90 adjacent the bearing block 92 and serves to blow air on the fins 121 located on the exterior surface of the bearing block 92, thereby assisting in the cooling of the block 92.

The heat from the bearing 116, which represents a substantial part of the heat generation within the developer unit 50, is primarily transferred from the bearing 116 to the bearing block 92. Preferably, the bearing block 92 is made from a thermally conductive material such as a metal, i.e. aluminum, and thus serves as a large heat sink to absorb the heat from the bearing 116. Since the bearing block 92 is more thermally conductive than the journal 90, only a marginal amount of heat is transferred from the bearing 116 to the auger journal 90. The heat generated within the developer from the work done on the developer and the eddy current losses in the magnetic brush roller (not shown) which is stored within the developer housing 81 may be dissipated at the external walls of the developer housing 81.

Figure 3:
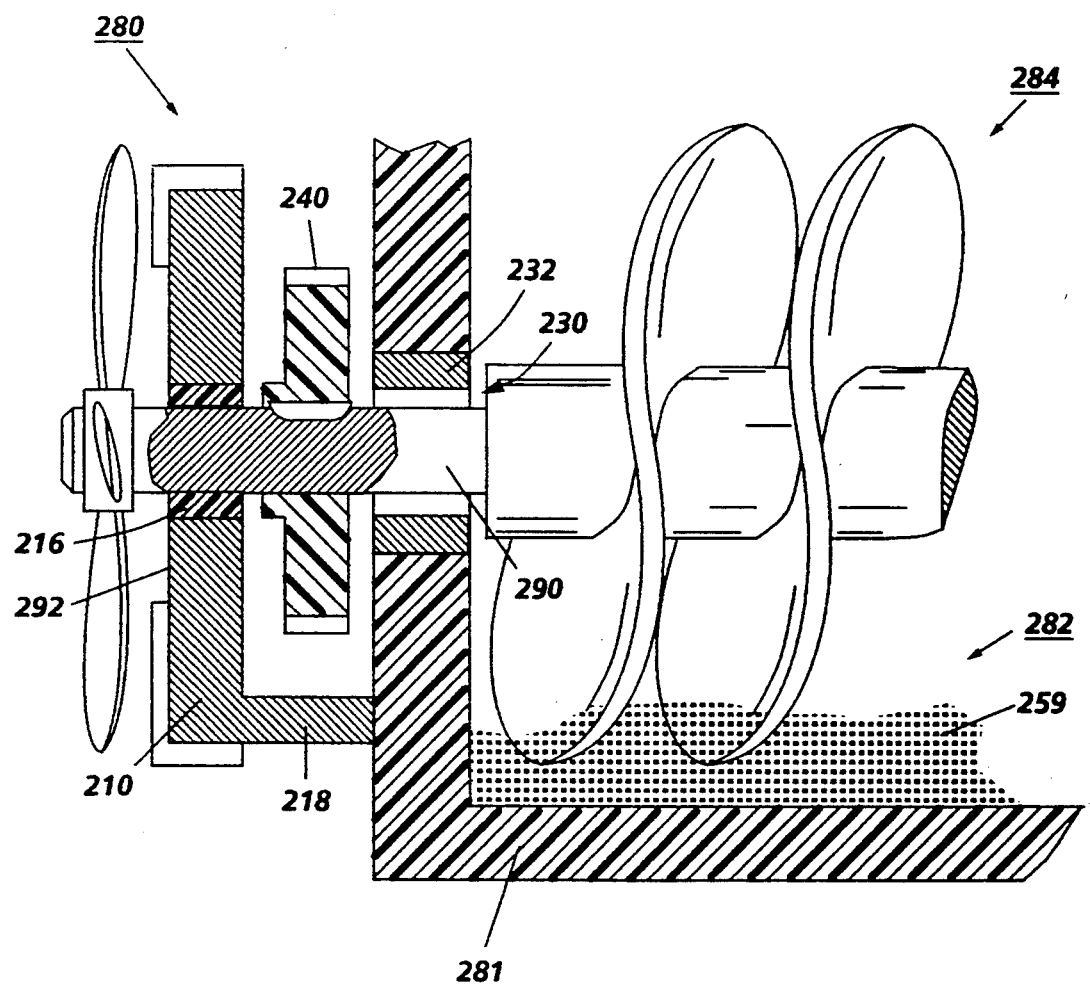
FIG. 3 is a partial sectional view of another alternate external bearing configuration for an auger with an internal gear in a development housing according to the present invention.
Figure 4:
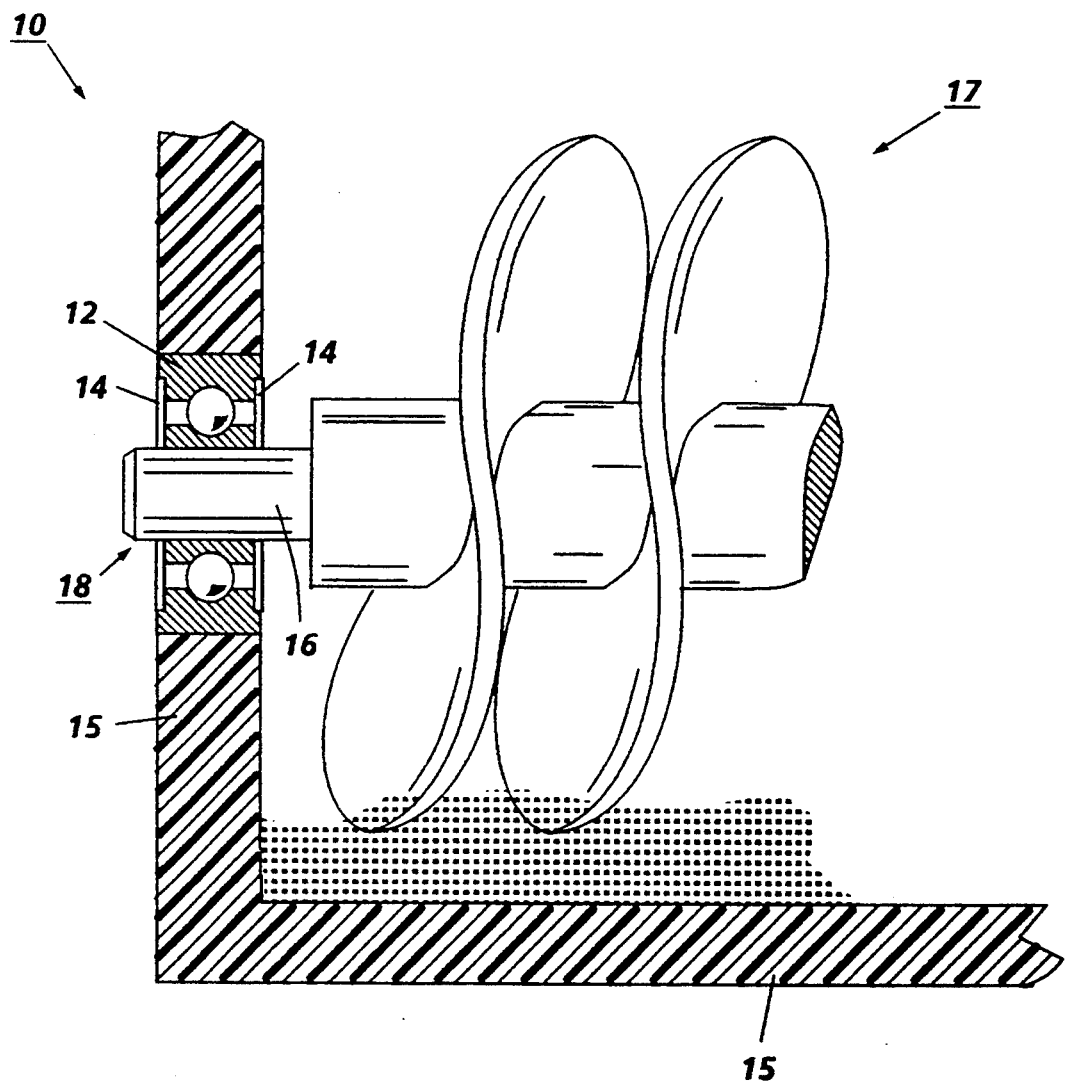
FIG. 4 is a partial sectional view of another prior art bearing configuration for an auger in a development housing.

Now referring to FIG. 3, another alternative embodiment of the invention is shown in support system 280. Support system 280 is similar to support system 80 of FIG. 1, except that drive member or gear 240 is located between bearing 216 located in plate portion 210 of the bearing block 292 and seal 232 located in the developer housing 281. The plate portion 210 of the block 292 is separated from the developer housing 281 by spacer portion 218 of the block 292. The developer housing 281 defines chamber 282 which contains a supply of developer material 259. An auger 284 is used to transfer, agitate, and triboelectrically charge the developer material 259 within the chamber 282. The auger 284 contains an auger journal 290 which is used to support the auger 284. The auger journal 290 extends through an opening 230 in the developer housing 281. The seal 232 is located at the opening 230 and serves to prevent the migration of the developer material 259 from the chamber 282. The seal 232 is similar to the seal 132 of FIG. 1. The gear 240 is located on the auger journal 290 outside the developer housing 281 adjacent the seal 232. The gear 240 is similar to gear 140 of FIG. 1. Preferably, however, the gear 240 is made of a magnetically nonpermeable material such as a plastic to prevent the magnetic field of the magnetic seal 232 from being disturbed. Extending outboard of the gear 240 is the bearing 216 which is slidably fit to the auger journal 290. Preferably, as with bearing 116 of FIG. 1, bearing 216 is a sleeve bearing. It should be appreciated that the bearing 216 may alternatively be a rolling element bearing similar to bearing 170 of FIG. 1A. If bearing 216 is a rolling element bearing the auger journal 290 may include an O-ring (not shown) which is used to thermally isolate the bearing 216 from the journal 290 and further permits more relaxed tolerances for the bearing 216 and the auger journal 290. The bearing 216 is supported by support structure or bearing block 292. The bearing block 292 is connected to housing 281.

Now referring to FIG. 6, another alternative embodiment of the invention is shown in apparatus 480 for sealing a shaft in the developer unit 60. Apparatus 480 is similar to the apparatus 80 of FIG. 1, except that the apparatus 480 further includes a spiral passageway 445 defined by threads 444 which are formed in auger journal 490 for drawing carrier granules 441 into a developer housing 481. The apparatus 480 also includes a multi-pole developer housing magnetic seal 432 for sealing contaminants from a bearing 416.

The developer housing 481 defines a chamber 482 which contains a supply of developer material 59. An auger 484 is used to transfer, agitate, and triboelectrically charge the developer material 59 within the chamber 482. The auger 484 contains journal 490 which is used to support the auger 484. The auger journal 490 extends through a seal bore 426 in the developer housing seal 432. The seal 432 serves to prevent the migration of the developer material 59 from the chamber 482.

The apparatus 480 serves to support the auger journal 490 of the developer unit 60. The apparatus 480 includes the support structure or support member 492 which is substantially similar to the bearing block 92 of FIG. 1.

The bearing 416 may be any suitable durable bearing such as a rolling element bearing, a journal bearing, or a sleeve bearing. The bearing 416 may be a greased radial ball bearing with lip seals, but preferably, the bearing 416 is a shielded or low friction sealed bearing or an unsealed bearing. To minimize the cost of the bearing 416 and to provide a low friction bearing, the bearing 416 may be a sleeve bearing having a non-stick surface such as Teflon ®.

The developer seal 432 is preferably made from a permanently magnetic or magnetizable material. The seal 432 is preferably made of a flexible strip made of a material such as commercially available magnetic tape. A magnetic field 440 is formed in a space 436 between the seal bore 426 and the journal 490. The magnetic field 440 attracts a quantity of carrier granules 441 to the space 436 to form a curtain of carrier granules that inhibit the progression of the developer material 59 through the space 436. The seal 432 may include shunts or shapers 442 in the form of magnetizable washers on faces 443 of the seal 432 to assist in directing the magnetic field 440. The shunts may also include a magnetizable ring 439 fitted over a seal outer periphery 438.

An outer layer of the carrier granules 441 may extend beyond crests 446 of the threads 444 which form the spiral passageway. The threads 444 have either a right hand spiral or a left hand spiral depending on the rotation of journal 490 in order that the crests 446 move the carrier granules 441 inwardly in the direction of an arrow 448 when the journal is rotated in its normal operating direction in the direction of an arrow 450. Carrier granules 441 which are located in a zone 452 outboard of the seal 432 are drawn by the threads 444 to the chamber 482. The threads 444 serve to trim excess carrier granules 441 and thus to reduce the torque required to rotate the journal 490. It should be appreciated that threads for seal (not shown) surrounding journal 490 on the opposite end of auger 484 will have the opposite hand spiral of the other end of the auger 484 to assure the carrier granules 441 are drawn by the threads into the chamber 482.

While the support systems 80, 280 and 480 as shown in FIGS. 1, 3 and 6, respectively, show a support system which supports an auger, it should be readily appreciated that the support systems 80, 280 and 480 may serve equally as well to support magnetic or nonmagnetic transport or developing rolls. Further, while the support systems 80, 280 and 480 of FIGS. 1, 3 and 6, respectively, show a support system with a journal which extends beyond the support structure and holds a gear, the support systems of the present invention serve equally as well in those support systems in which the journal ends at or near the outer face of the bearing.

Now referring again to FIG. 5, bearing block 92 is shown located on the end plate 100 of developer housing 81. The block 92 supports auger 84. Likewise, the block 92 may be used to support a second auger 152, a transport roller 156, and a developer roller 162. It should also be appreciated that smaller individual bearing blocks (not shown) may alternatively be used to separately support the auger 84, the auger 152, the transport roller 156 or the developer roller 162.

The use of a bearing located outboard and spaced from the developer housing isolates the heat generated by the bearing from the developer material, thus reducing the temperature rise within the unit and the likelihood of forming agglomerates. When the bearings employed are made from a magnetizable material, the use of a bearing located outboard and spaced from the developer housing also magnetically isolates the magnetic seal from the magnetizable bearing, thus improving the efficiency of the magnetic seal and reducing the possibility that magnetic beads will migrate to the bearing.

The formation of a chamber between the developer housing seal and the support bearing provides a chamber which will trap developer material which would migrate through the seal, thus permitting the use of less effective seals.

The use of a bearing support block which is separated from the developer housing permits the heat from the bearing to be transferred to the bearing block and not to the developer housing thus channeling the heat from the bearing to an area outside of the developer chamber. The use of a seal between the bearing and the auger journal prevents the heat from the bearing to be transferred through the auger shaft to the auger and the developer material within the chamber.

The use of a bearing support block which is separated from the developer housing further permits the location of drive components both inboard and outboard of the bearing thus providing for reduced bearing loads and providing a more compact design.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A developer unit, comprising:
   a housing defining a chamber for storing a supply of toner therein;
   a member for moving the toner in the chamber of said housing;
   a support structure, projecting from said housing, for supporting said member, said support structure mounted on an external surface of said housing, said support structure including a thermally conductive material; and
   a bearing located in said support structure, said bearing being spaced from said housing and rotatably supporting said member.

2. A developer unit, comprising:
   a housing defining a chamber for storing a supply of toner therein;
   a member for moving the toner in the chamber of said housing;
   a support structure, projecting from said housing, for supporting said member, said support structure mounted on an external surface of said housing;
   a bearing located in said support structure, said bearing being spaced from said housing and rotatably supporting said member; and
   a resilient member interposed between said moving member and said bearing.

3. A developer unit, comprising:
   a housing defining a chamber for storing a supply of toner therein;
   a member for moving the toner in the chamber of said housing;
   a support structure, projecting from said housing, for supporting said member, said support structure mounted on an external surface of said housing, said support structure being integral with said housing; and
   a bearing located in said support structure, said bearing being spaced from said housing and rotatably supporting said member.

4. A developer unit, comprising:
   a housing defining a chamber for storing a supply of toner therein;.
   a member for moving the toner in the chamber of said housing;
   a support structure, projecting from said housing, for supporting said member, said support structure mounted on an external surface of said housing;.
   a bearing located in said support structure, said bearing being spaced from said housing and rotatably supporting said member; and
   means for cooling said support structure.

5. A developer unit as in claim 4, wherein said cooling means comprises fins secured to an external surface of said support structure for cooling said support structure.

6. A developer unit, comprising:
   a housing defining a chamber for storing a supply of toner therein;
   a member for moving the toner in the chamber of said housing;
   a support structure, projecting from said housing, for supporting said member;
   a bearing located in said support structure, said bearing being spaced from said housing and rotatably supporting said member;
   wherein said support structure includes a plate defining an aperture adapted to have said bearing mounted therein and a spacer interposed between a portion of said plate and said housing to space said plate from said housing.

7. The developer unit as in claim 6 wherein said bearing is integral with said plate.

8. An electrophotographic printing machine of the type having a developer unit adapted to develop with toner an electrostatic latent image recorded on a photoconductive member, wherein said developer unit comprises:
   a housing defining a chamber for storing a supply of toner therein;
   a member for moving the toner in the chamber of said housing;
   a support structure, projecting from said housing, for supporting said member, said support structure mounted on an external surface of said housing, said support structure including a thermally conductive material; and
   a bearing located in said support structure, said bearing being spaced from said housing and rotatably supporting said member.

9. An electrophotographic printing machine of the type having a developer unit adapted to develop with toner an electrostatic latent image recorded on a photoconductive member, wherein said developer unit comprises:
   a housing defining a chamber for storing a supply of toner therein;
   a member for moving the toner in the chamber of said housing;
   a support structure, projecting from said housing, for supporting said member, said support structure mounted on an external surface of said housing;
   a bearing located in said support structure, said bearing being spaced from said housing and rotatably supporting said member; and
   a resilient member interposed between said moving member and said bearing.

10. An electrophotographic printing machine of the type having a developer unit adapted to develop with toner an electrostatic latent image recorded on a photoconductive member, wherein said developer unit comprises:
    a housing defining a chamber for storing a supply of toner therein;
    a member for moving the toner in the chamber of said housing;
    a support structure, projecting from said housing, for supporting said member, said support structure mounted on an external surface of said housing, said support structure being integral with said housing; and
    a bearing located in said support structure, said bearing being spaced from said housing and rotatably supporting said member.

11. An electrophotographic printing machine of the type having a developer unit adapted to develop with toner an electrostatic latent image recorded on a photoconductive member, wherein said developer unit comprises:

a housing defining a chamber for storing a supply of toner therein;

a member for moving the toner in the chamber of said housing;

a support structure, projecting from said housing, for supporting said member, said support structure mounted on an external surface of said housing;

a bearing located in said support structure, said bearing being spaced from said housing and rotatably supporting said member; and means for cooling said support structure.

12. A printing machine as in claim 11, wherein said cooling means comprises fins secured to an external surface of said support structure for cooling said support structure.

13. An electrophotographic printing machine of the type having a developer unit adapted to develop with toner an electrostatic latent image recorded on a photoconductive member, wherein said developer unit comprises:

a housing defining a chamber for storing a supply of toner therein;

a member for moving the toner in the chamber of said housing;

a support structure, projecting from said housing, for supporting said member;

a bearing located in said support structure, said bearing being spaced from said housing and rotatably supporting said member;

wherein said support structure includes a plate defining an aperture adapted to have said bearing mounted therein and a spacer interposed between a portion of said plate and said housing to space said plate from said housing.

14. The printing machine as in claim 13 wherein said bearing is integral with said plate.

15. An apparatus for supporting with a bearing a shaft in a chamber of a housing storing a supply of toner, comprising:

a plate defining an aperture adapted to have the bearing located therein; and a spacer interposed between a portion of said plate and the housing to space said plate from the housing.

16. An apparatus as in claim 15, wherein said apparatus is mounted on an external surface of the housing.

17. An apparatus as in claim 16, further comprising a seal secured to the housing.

18. An apparatus as in claim 17, wherein said seal comprises a magnetic seal.

19. An apparatus for supporting with a bearing a shaft in a chamber of a housing storing a supply of toner, comprising:

a plate defining an aperture adapted to have the bearing located therein, said plate including a thermally conductive material; and a spacer interposed between a portion of said plate and the housing to space said plate from the housing, said apparatus mounted on an external surface of the housing.

20. An apparatus for supporting with a bearing a shaft in a chamber of a housing storing a supply of toner, comprising:

a plate defining an aperture adapted to have the bearing located therein;

a spacer interposed between a .portion of said plate and the housing to space said plate from the housing said apparatus mounted on an external surface of the housing; and a resilient member interposed between the shaft and the bearing.

21. An apparatus as in claim 20, wherein said resilient member comprises an O-ring.

22. An apparatus for supporting with a bearing a shaft in a chamber of a housing storing a supply of toner, comprising:

a plate defining an aperture adapted to have the bearing located therein;

a spacer interposed between a portion of said plate and the housing to space said plate from the housing, saidapparatus mounted on an external surface of the housing; and means for cooling said apparatus.

23. An apparatus as in claim 22, wherein said cooling means comprises fins secured to an external surface of said apparatus for cooling said apparatus.

* * * * *